United States Patent [19]
Poll

[11] 3,815,524
[45] June 11, 1974

[54] MULCH POT PLANTER

[76] Inventor: Benjamin Poll, 465 Brecado, Holland, Mich. 49423

[22] Filed: Aug. 11, 1971

[21] Appl. No.: 170,853

[52] U.S. Cl. .................................. 111/2, 111/91
[51] Int. Cl. ............................................ A01c 11/00
[58] Field of Search .............. 111/91, 2, 3; 172/519

[56] References Cited
UNITED STATES PATENTS

| | | | |
|---|---|---|---|
| 2,249,638 | 7/1941 | Rietz.................................. | 172/519 |
| 2,486,462 | 11/1949 | Carelock............................. | 111/3 X |
| 2,625,122 | 1/1953 | Carelock............................. | 111/3 |
| 3,078,816 | 2/1963 | Poll..................................... | 111/2 |
| 3,103,186 | 9/1963 | Saifuku............................... | 111/2 |
| 3,176,635 | 4/1965 | Mabon................................ | 111/91 X |

*Primary Examiner*—Stephen C. Pellegrino
*Attorney, Agent, or Firm*—Price, Heneveld, Huizenga & Cooper

[57] ABSTRACT

A machine for planting organic matter through plastic sheeting laid over bare earth. The planting machine comprises a series of buckets which hold the organic matter, form openings in the earth and deposit the organic matter in the openings and are pivotally mounted on two horizontally offset bucket support wheels which maintain the buckets in an erect vertical position at all times. The bucket support wheels are in turn mounted on a generally horizontal frame supported by two wheels and tires for movement over the surface of the earth and include positive drive means to rotate said bucket support wheels and buckets at a constant rotational speed. One of two alternative packing means is incorporated in the machine to secure the deposited matter in the earth. Camming means are included to open the buckets at a predetermined position and to raise one of the alternative packing means over the deposited matter.

26 Claims, 7 Drawing Figures

INVENTOR.
BENJAMIN POLL

BY

ATTORNEYS 3,815,524

MULCH POT PLANTER

This invention relates to machines for the planting of organic matter, and more particularly to machines which are capable of planting seedlings, potted plants, and seeds in either bare earth or earth covered with a sheet of plastic or paper.

BACKGROUND OF THE INVENTION

In the past, several machines for the planting of potted plants have been devised. These machines, such as my earlier invention, U.S. Pat. No. 3,246,615, have been very advantageous in planting potted plants in bare uncovered earth. Typically, they have included means for digging a long narrow trench or furrow just ahead of the point at which a seedling or potted plant is to be deposited in the earth. Following the deposition of the plant, the furrow or trench is filled in by various means to hold the plant upright and to secure it in the ground.

Subsequent to the development of these earlier potted plant planting machines, farming methods in the United States and other areas of the world continued to develop and change and therefore necessitated the use of different planting methods. More particularly, one important change in farming methods was the utilization of a sheet or layer of plastic or paper laid over and anchored to a strip of bare earth. Following the laying of the sheet, previously started and potted plants or seedlings having partially developed root systems, were planted through the sheet of plastic or paper in the earth. However, this method required a great deal of physical labor in that individual holes had to be cut for each plant through the layer of plastic or paper before the plant could be inserted. Therefore, farmers were hesitant to use the method even though the utilization of the sheet resulted in crops which could be placed on the market at a much earlier date, since the potted plants or seedlings could be moved from the greenhouses prior to the beginning of the natural growing season. Consequently, the need was apparent for a planting machine which could plant potted plants, seedlings with partially developed root systems, or seeds, through a sheet of plastic previously laid over bare earth, in a manner rapid enough to make the utilization of such plastic sheets economically feasible. Similarily, the need was apparent for machines which were simple in their operation and therefore extremely reliable, which also had the flexibility of accommodating the planting of narrower or wider rows, and of planting greater or lesser numbers of potted plants, seedlings with partially developed root systems, or seeds in each row. Accordingly, the present machine was invented to fill these substantial needs.

SUMMARY OF THE INVENTION

The novel and unique features of the present invention may be accomplished by providing a machine for the planting of organic matter described as follows. Generally the planting machine comprises means for movement over the surface of the earth supporting a frame including means for attachment to a source of motive power. Also included are means for holding organic matter, forming openings in the earth and depositing said organic matter in the earth, which organic matter holding, forming and depositing means are pivotally mounted on rotational means. The rotational means allow movement of the holding, forming and depositing means in a circular path whose plane is parallel to the direction of motion of the machine while the holding, forming and depositing means are held approximately vertically upright at all times. The machine also includes drive means which positively drive the rotational means and thus the holding forming and depositing means. Camming means are included for opening the holding, forming and depositing means in a direction parallel to the motion of the machine, at a predetermined position to allow the deposition of the organic matter in the earth. Additionally, packing means are provided to secure the deposited organic matter in the earth.

Therefore, the present inventive and novel planting machine comprises means which hold a potted plant, seedling or seed, form an opening in a sheet of plastic and the earth underneath, deposit the plant or seed in the opening, and pack dirt about the deposited plant or seed, all in one continuous operation.

These and other objects, advantages and features of the invention will become apparent from a study of the following description taken in conjunction with the drawings.

DESCRIPTION OF THE PREFERRED EMBODIMENT

Figure 3:
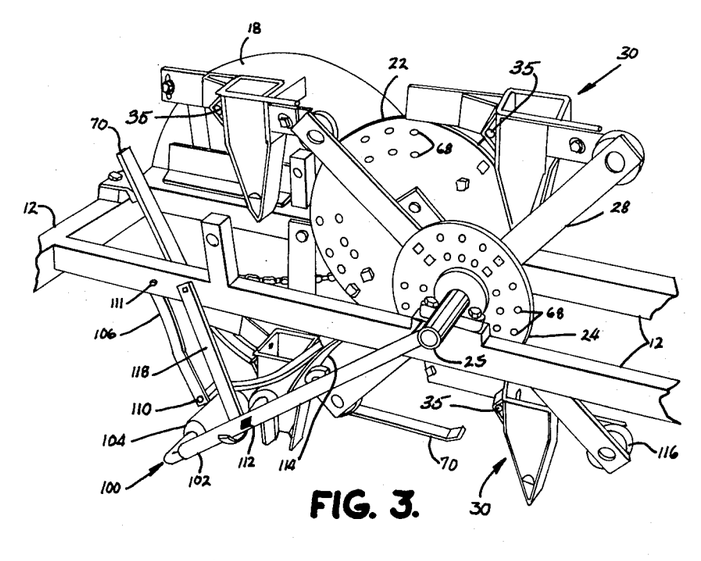
FIG. 3 is a perspective side view of the planting machine incorporating the alternative packing means, i.e., the pivoting packing arm and packing roller.

Referring to the drawings, the present novel planting machine is shown generally at 10. The planting machine 10 comprises a frame 12 including a hitch 14, support wheels and tires 16 and 18, drive means 60, bucket support wheels 22 and 24, bucket support arms 26 and 28 for bucket support wheels 22 and 24 respectively, and elements or buckets 30 for holding potted plants, seedlings, seeds, or other organic matter, forming openings in the earth through a sheet of plastic laid over bare earth, and depositing said matter in the openings. Also included in the planting machine 10 is a curvilinear camming track 70 for opening the buckets 30 at a predetermined position to enlarge the openings and allow the deposition of the organic matter. Packing means 80 are provided and comprise a pair of packing wheels 82 mounted on support members 84 which support members are in turn pivotally mounted on frame 12. Alternatively, as shown in FIG. 3, the planting machine 10 may include an alternative packing means 100 including a support arm 102 pivotally mounted on frame 12 and a packing roller 104.

The terms horizontal and vertical used in this description are used to orient the machine in relation to the surface of earth. They are not intended to be limiting in any respect. Additionally, the front of the machine will be considered to be at the end containing hitch 14 and the rear at the end including wheels and tires 16 and 18.

Figure 1:
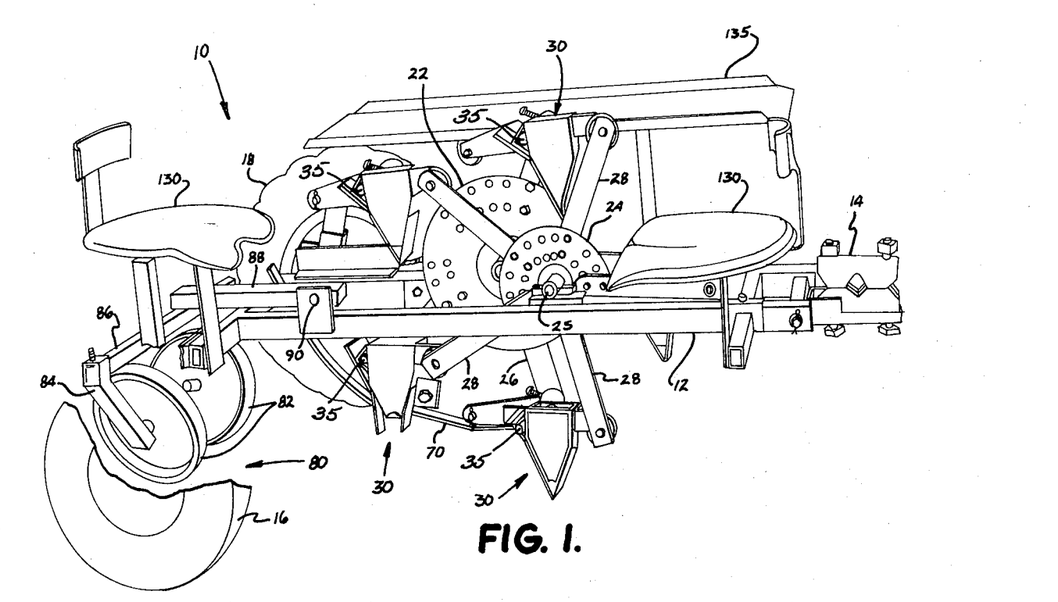
FIG. 1 is a perspective, side view of the present novel planting machine, partially fragmented to show one of the packing means.

Referring now more particularly to the individual drawings, the components of the planting machine 10 will be described in greater detail. As shown in FIG. 1, a generally horizontal frame 12 including a hitch or other means of attachment to a source of motive power 14 is movably supported by support wheels and tires 16 and 18 mounted on support shafts 19. The frame includes adjustment means 13 to adjust the height of the planting machine above the surface of the earth. The height of the machine in turn adjusts the depth of the openings formed in the earth by buckets 30. Mounted atop and generally towards the center of frame 12 are the rotational means comprising bucket support wheels 22 and 24 including at least one bucket support arm 26 and 28 on each wheel respectively. Bucket support wheels 22 and 24 rotate in vertical planes on rotational shafts 23 and 25 respectively. These vertical planes are parallel to the direction of motion of the machine 10 and are spaced horizontally apart. The bucket support wheels 22 and 24 may be of the same or different diameters. The rotational shafts 23 and 25 are horizontally off-set in the direction of motion of the machine to provide horizontally off-set support points for buckets 30, thereby keeping buckets 30 in erect vertical alignment at all times, as described more fully below.

Mounted between the corresponding pairs of bucket support arms 26 and 28 are a plurality of elements or buckets 30 which perform the functions of holding the organic matter to be planted, forming openings in either the bare earth or through plastic or paper sheeting and depositing the organic matter in the earth. The buckets 30 are pivotally supported by bolts or shafts 32 and 34, shaft 34 being disposed at the end of a horizontal arm 36 extending generally towards the front of the machine 10. As explained more fully below, the distances from rotational shafts 23 and 25 to shafts 32 and 34, respectively, are preferably equal.

Figure 5:
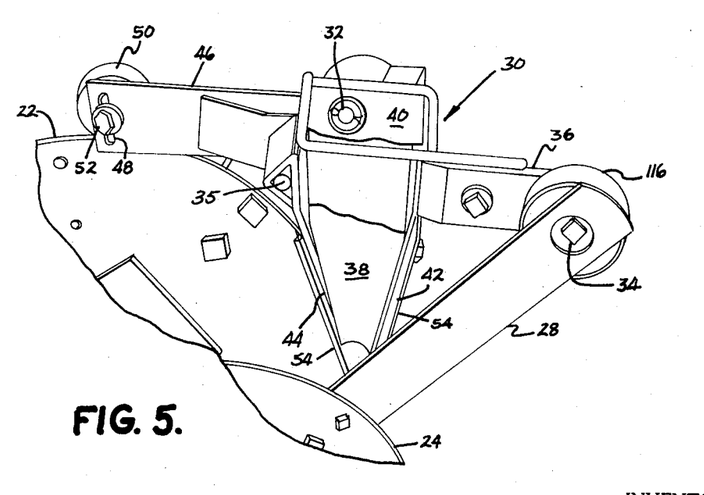
FIG. 5 is an enlarged, perspective view of the organic matter holding bucket as supported by the bucket support wheels and arms.

As shown in FIG. 5, the buckets 30 generally comprise enclosures having the shape of an upright V with one end being open. The enclosure is formed by three fixed side walls 38, 40 and 42 and one pivotally movable wall 44. Pivotal wall 44 pivots about bucket support shaft 35 in a direction parallel to the direction of motion of machine 10, and includes a generally horizontal pivot arm 46 extending therefrom. Pivot arm 46 includes a slot 48 formed at the end thereof in a generally vertical orientation, i.e., perpendicular to the surface of the earth over which the machine is moving, which slot 48 accommodates a roller cam follower 50 adjustably mounted therein by means of a threaded bolt 52. The operation of the pivotal side wall 44 by means of pivot arm 46 and roller cam follower 50 will be described more fully below. Side walls 42 and pivotal side wall 44 also include blades 54 formed from high carbon spring steel such that the blades 54 are very durable and will withstand repeated penetrations of the earth. The steel used for blades 54 is a high carbon steel having a carbon content of between about 0.5 and 2.0 percent carbon. Since very high carbon content steel is very brittle, it has been found that a carbon content range of between about 0.5 percent and 1.5 percent is preferable. One such steel which has been found to be very durable when used to form blades 54 is SAE NO. 1065 steel. Such steel also contains some manganese which enhances the desirable qualities of the blades. After forming, the blades are annealed to a hardened state to increase their durability.

Buckets 30 also accommodate various sized inserts 31 (FIG. 2) which inserts may be changed depending on the size of the potted plants, seedlings or seeds to be deposited in the planting operation.

Figure 4:
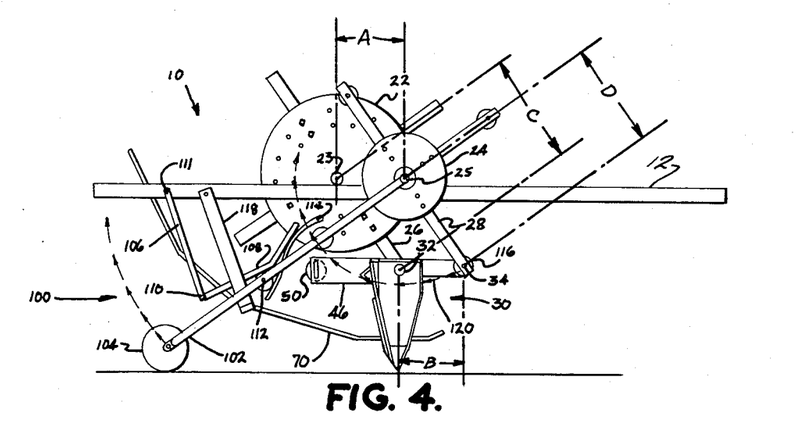
FIG. 4 is a schematic view of the operation of the bucket support wheels, bucket support arms, organic matter holding buckets, and camming means.
Figure 7:
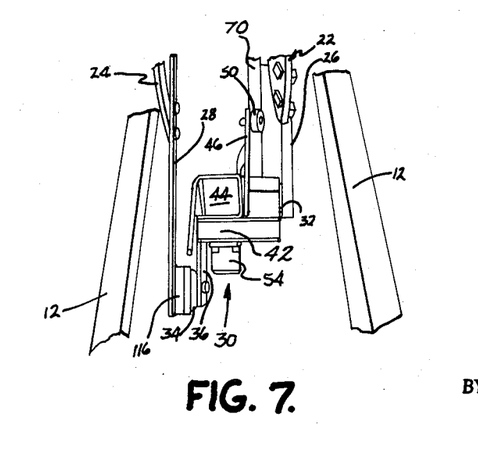
FIG. 7 is a perspective, end view of one of the buckets supported by the bucket support wheels and arms.

As described above, and in reference to FIGS. 1 through 5, buckets or elements 50 are supported at two points by support arms 26 and 28 and shafts 32 and 34, said two points being spaced horizontally in two directions, i.e., both in the direction of motion of the planting machine 10 and laterally across the machine 10, as shown in FIG. 7. As shown in FIG. 4, the preferred geometrical positioning of the bucket support shafts 23 and 25 and bucket support points 32 and 34 is that these shafts and points must form a parallelogram (defined as "quadralateral with parallel sides which are therefore equal" in *Webster's New International Dictonary*, 2nd Edition, 1960). Thus, side A of the parallelogram equals and is parallel to side B, and side C equals and is parallel to side D. Consequently, since side A is preferably fixed in a horizontal position because shafts 23 and 25 are preferably mounted horizontally on frame 12, side B must stay parallel to side A during any rotation in order to maintain the parallelogram, and, therefore, the two point spaced support arrangement confines each bucket 30 in an approximately vertically upright position throughout the entire rotational path of travel. Consequently, at every point on the rotational path of travel of buckets 30 the blades 54 will be pointing vertically downward and the openings in the top of buckets 30 will be directed vertically upward to allow the manual deposition of individual potted plants, seedlings, or seeds in the enclosure of the bucket.

Figure 2:
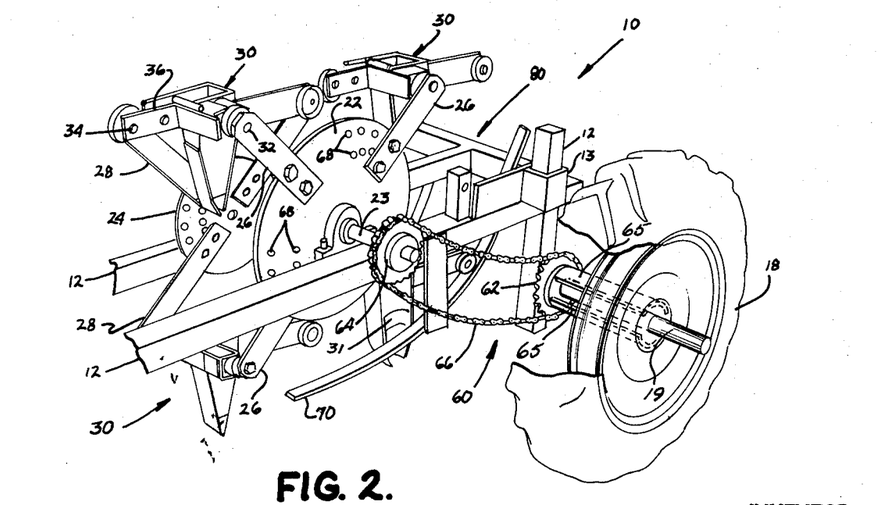
FIG. 2 is a perspective view of the side opposite the side shown in FIG. 1 partially fragmented to show the drive means.

The bucket support wheels 22 and 24, bucket support arms 26 and 28, and buckets 30 are all driven in a circular path in a plane parallel to the direction of motion of machine 10 by a drive means 60, as shown in FIG. 2. Drive means 60 comprises a first sprocket 62 mounted on support shaft 19 and a second sprocket 64 mounted on rotational shaft 23. Sprockets 62 and 64 are positively interconnected by means of a link chain 66. Thus, as the support wheel and tire 18 are rotated by means of contact with the ground, first sprocket 62 is driven at the same rotational speed as wheel and tire 18 by means of connecting tube 65 (shown partially fragmented in FIG. 2). Consequently, because of the positive interconnection of link chain 66 with sprockets 62 and 64, second sprocket 64 and thus the entire rotational means comprising the bucket support wheels 22 and 24, bucket support arms 26 and 28, and buckets 30 are driven at the same rotational speed as that of wheel and tire 18 (i.e., or a speed directly proportional to that of wheel and tire 18). The potted plants, seedlings or seeds will be planted evenly along the path of motion of the machine 10, since any time wheel and tire 18 rotates, the buckets 30 will also be rotated, thereby always depositing plants through the plastic sheet and into the earth at an even rate. Only if wheel and tire 18 fails to rotate will there by an uneven spacing of the plants. To allow the machine 10 to accommodate wider or narrower rows for different types of crops, shafts 19 and 23 may be extended to allow the lateral movement of the wheel and tire 18 and the first and second sprockets 62 and 64 to accommodate the wider or narrower crop rows. Similarly, since the buckets are driven in their rotational path of travel at a constant rotational speed by means of drive means 60, the increase or decrease of spacing between the plants planted by machine 10 is accomplished by decreasing or increasing, respectively, the number of the pairs of bucket support arms 26 and 28 thereby decreasing or increasing the number of buckets utilized on the machine 10. In this connection, additional holes 68 are provided on wheels 22 and 24 to accommodate the additional buckets. Although the machine 10 will operate with only one bucket 30, it is necessary in that case to conduct two other bucket support arms by means of a tie rod or connecting arm (not shown) to prevent the bucket support wheels 22 and 24 from rotating with respect to one another during operation.

Operably associated with the buckets 30 are camming means comprising a roller cam follower 50, described above, and a camming surface or track 70. The camming means operate to move the pivot arms 46 thereby causing the pivotal walls 44 of buckets 30 to rotate away from the fixed walls after the lower portion of the buckets 30 have penetrated the earth. Therefore, the operation of the camming means causes the openings in the earth to be enlarged in a predetermined position in the rotational path of travel of the buckets 30 as the roller cam follower engages the camming track 70 after the buckets have penetrated the earth. Since the movement of bucket wall 44 occurs in a direction parallel to the direction of motion of the machine 10, the inertia of the moving machine greatly reduces the force needed to enlarge the opening in the earth.

As described above, slot 48 is provided in the end of pivot arm 46 to allow the adjustment of the height of roller cam follower 50, thereby changing the time in the rotational path of travel at which roller 50 first engages camming track 70, as shown in FIG. 5. Thus, by moving the roller 50 up or down in slot 48 the enlargement of the opening in the earth may be delayed or advanced with respect to the time the bucket 30 first enters the earth.

As the roller 50 engages the camming track 70 the configuration of the curvilinear track 70 allows the bucket 30 to fully penetrate the earth as far as it can before the camming operation begins to open the bucket 30. After the bucket 30 has made its deepest penetration of the earth, as defined by the lowermost arc on the rotational path of travel of the bucket 30, curvilinear camming track 70 begins to slope upward, thereby causing the roller 50 to follow the track upward and pivot the pivot arm 46 and movable wall 44 away from the fixed walls 38, 40 and 42. Simultaneously, as the moveable wall 44 begins to enlarge the opening formed by the bucket 30 in the earth, the organic matter held within the bucket begins to slide downward toward the opening which is then being enlarged. As the opening is enlarged to the maximum amount, the organic matter is allowed to completely slide out of the bucket 30 and into the opening formed in the earth. Then, as the bucket 30 continues in its circular path of travel, the complex dynamic motion combining the forward motion of the machine 10 as a whole and the rotational motion of the bucket 30 itself, causes the bucket 30 to be withdrawn vertically from the opening it has formed in the earth. Consequently, no part of the bucket 30 will strike the deposited organic matter, and the organic matter will remain in an upright position ready to have dirt securely packed around its base in the opening in the earth by one of the packing means 80 or 100 described below.

Figure 6:
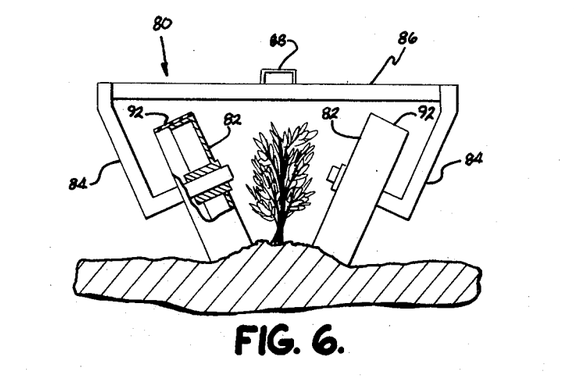
FIG. 6 is an enlarged, end view of the packing wheels and support arm shown in partial cross section.

The planting machine 10 may be manufactured with either of two packing means, 80 or 100, depending on the type of planting to be done. Packing means 80 comprises a pair of packing wheels 82 rotationally mounted on support members and shafts 84 which in turn are mounted on cross arm 86. Cross arm 86 is in turn attached to a packing means pivot arm 88 which in turn is pivotally mounted on frame 12 at pivot point 90 as shown in FIG. 1. The pivotal mounting of the packing means 80 at point 90 allows the packing means as a unit to accommodate any irregularities in the surface of the earth by allowing the unit to pivot along the contour of the earth. A rack or shelf (not shown) may be attached atop cross arm 86 to allow rocks or additional weights to be placed on packing wheels 82, thereby increasing their packing efficiency. As shown in FIG. 6, the packing wheels 82 are mounted with their planes at an angle, with the vertical and with one another, such that the lowermost portions of the packing wheels are spaced apart just enough to allow the passage therebetween of the organic matter deposited in the earth by the bucket means 30. The upper portions of the packing wheels 82 are spaced further apart to allow the passage therebetween of any portion of the deposited orgnaic matter which extends above the surface of the earth. The packing means 80 trail directly behind the area in which the buckets 30 are forming the openings in the earth and depositing the organic matter, and force the loose dirt surrounding the deposited organic matter into the opening thereby securely packing the earth around the deposited organic matter. To reduce the size of the tracks or troughs left by the wheels 82 as they roll past the deposited organic matter, a rubber lip 92 may be attached to the circumference of each wheel thereby making the packing surface of the wheels 82 somewhat flexible. Therefore, as the wheels 82 roll over the surface of the earth, they will tend to urge dirt towards the opening and the deposited organic matter, but because of the flexibility of the rubber lip 92 they will not form as deep a trough in the earth as would completely rigid wheels. This feature is very advantageous with crops such as tomatoes since it minimizes any troughs in which water can collect and sit. Therefore, when the tomatoes become ripe and drop off of the plants, they will not tend to spoil in any standing water left in troughs alongside the plants. Similarly, the rubber lip greatly reduces the tendencies of the packing wheels 82 to rip or tear the plastic sheeting through which the plants or organic matter are being deposited.

With other types of crops, and especially when plastic or paper sheeting is used through which the organic matter is planted, the packing means 100 may be incorporated in the planting machine 10. Packing means 100 greatly reduces the possibilities of tearing the sheeting laid over the ground during the packing operation. As shown in FIGS. 3 and 4, packing means 100 comprises a support arm 102 pivotally mounted on the extended rotational shaft 25 for bucket support wheel 24, which arm includes a packing roller 104 rotationally mounted on the support arm 102 on right angle leg 103 formed in support arm 102. Packing means 100 is mounted such that packing roller 104 rolls directly behind the area in which the openings are formed in the earth by buckets 30. The packing roller 104 thus follows the deposition of the organic matter in the openings and securely packs dirt around the base of the deposited organic matter by rolling to a point immediately adjacent each deposited plant. However, since packing roller 104 would otherwise roll completely over the deposited plant, packer camming means are provided to raise the packing roller 104 by means of pivotal support arm 102 over the top of the deposited organic matter.

The packer camming means comprise link members 106 and 108 pivotally interconnected at point 110 and pivotally mounted between frame 12 and support arm 102 at points 111 and 112 respectively. Mounted on link member 108 so as to pivot with link member 108 is a curvilinear cam follower track 114. Track 114 cooperates with a camming surface 116 formed about shaft 34 comprising one of the pivotal points for the buckets 30. As the camming surface 116 rotates about the circular path of travel defined by bucket wheels 22 and 24 and bucket support arms 26 and 28, the camming surface 116 will engage the cam follower track 114 as bucket 30 begins to lift out of the opening formed in the earth. As the bucket support wheels continue to lift bucket 30, camming surface 116 continues to raise support arm 102 by means of cam follower track 114, thereby raising the packing roller 104 over the top of the deposited organic matter. As camming surface 116 continues on its rotational path of travel it will eventually reach the end of the cam follower track 114 thereby releasing the support arm 102 and the packing roller 104 allowing them to gravitate or fall back to the surface of the earth on the outer side of the deposited organic means. Packing means 100 is then in position to roll and pack the earth for the next opening and deposited plant. A spring biasing means (not shown) may be added to packing means 100 to increase the packing pressure exerted by roller 104. A support hook 118 is provided to prevent the support arm 102 from pivoting downwardly too far should the planting machine be raised from the surface of the ground. The planting machine 10 may also include one or more seats 130 and trays 135, as shown in FIG. 1, to provide space for operators to sit on the planting machine and manually place the individual potted plants, seedlings, or seeds in the buckets 30. The added weight of the operators helps insure positive contact of wheel and tire 18 with the ground at all times.

The operation of the planting machine 10 will now be apparent. In reference to FIG. 4, the bucket support wheels 22 and 24, whose offset rotational shaft 23 and 25 are mounted on frame 12, include bucket support arms 26 and 28 which support buckets 30 at two horizontally offset points by means of shafts 32 and 34. As stated above, shafts 23 and 25 and points 32 and 34 on each bucket 30 form a parallelogram which is maintained throughout the entire rotational path of travel of each bucket. Thus, offset mounting of the rotational shafts 23 and 25, and the offset bucket support points 32 and 34, allow the bucket 30 to be held rigidly upright in an approximate vertical position throughout its entire rotational path of travel represented by dotted line 120. The buckets 30 are driven around path 120 at a speed directly proportional to the speed of wheel and tire 18 by means of drive means 60 (not shown in FIG. 4). As the buckets 30 approach the lowermost position on the path 120 they begin to penetrate the surface of the earth. The complex dynamic motion combining movement of the planting machine 10 and the rotational movement of the buckets 30 allow the buckets to penetrate vertically into the earth. As the buckets 30 continue on their rotational path 120, roller cam follower 50 engages camming tracks 70 to begin the pivotal opening of movable side wall 44 by means of pivot arm 46. The curvilinear camming track 70 has an increase in its slope which causes the movable side wall 44 to enlarge the opening in the earth as the bucket 30 continues around its rotational path of travel 120. As described above, as the bucket 30 opens, the organic matter held within the bucket is allowed to slide into the opening formed in the earth. As the bucket continues around path 120 the bucket will be withdrawn from the opening in the earth in a vertical manner due to the combined motions of the forward movement of planting machine 10 and the bucket support wheels 22 and 24. Thus, the organic matter is left standing upright in the enlarged opening formed in the surface of the earth.

Following the deposition of the organic matter in the opening, either of the packing means 80 or 100 will fill in and securely pack earth about the deposited organic matter. As shown in FIG. 4, packing means 100 includes packing roller 104 which fills in the opening in the earth by rolling to a point immediately adjacent the deposited organic matter. At a point directly behind the deposited organic matter, camming surface 116 which has rotated to a position immediately adjacent curvilinear cam follower track 114, engages track 114 and begins to raise packing roller 104 over the top of the deposited organic matter by means of pivotal support arm 102. As the buckets 30 continue along their path 120, the forward movement of the planting machine 10 carries the packing roller 104 past the deposited organic matter and camming surface 116 reaches the end of track 114, thereby releasing packing roller 104 and support arm 102 and allowing them to gravitate back to the surface of the earth. The packing roller 104 will thus be in position to securely pack earth about the next deposited plant. If packing means 80 is incorporated in the planting machine 10, instead of packing means 100, there is no packer camming means associated with the machine 10. As shown in FIG. 6, packing means 80 follows directly behind the area in which the openings are formed and packs earth about deposited organic matter by means of two packing wheels 82 including rubber lips 92 which allow the deposited organic matter to pass therebetween while urging and packing dirt about the base of the deposited organic matter.

Therefore, the present novel and inventive planting machine 10 comprises means which hold a potted plant, seedling or seed, form an opening through a sheet of plastic or paper and in the earth underneath, deposit this plant or seed in the opening, and pack dirt about the deposited plant or seed all in one continuous operation. It will be apparent to one skilled in the art that planting machine 10 is capable of planting organic matter through plastic or paper sheeting laid over bare earth or in bare earth without any plastic or paper sheeting or covering. It is also apparent that the structure provided to accomplish these operations will be both simple and reliable since the planting machine 10 has a minimal amount of moving parts, which parts are positively driven in relation to the movement of the machine 10 over the surface of the earth.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims as follows.

The embodiments of the invention in which an exclusive property or privilege is claimed are defined as follows:

1. A machine for the planting of organic matter comprising means for movement over the surface of the earth; a frame including means for attachment to a source of motive power; means for holding organic matter, forming openings in the earth, and depositing said organic matter in the earth; rotational means for movement of said holding, forming and depositing means from plant receiving to plant depositing positions; means to drive said rotational means; means for opening said holding, forming and depositing means at said plant depositing position to allow the deposition of said organic matter in the earth; said rotational means comprising support wheels for supporting said organic matter holding means and which rotate in parallel planes, said planes being parallel to the direction of motion of said machine and spaced apart; said support wheels being mounted on rotational shafts, which shafts are spaced horizontally apart in a direction parallel to the direction of motion of said machine; said support wheels each including at least one support arm, said support arms from each wheel pivotally supporting said organic matter holding means at two support points horizontally spaced apart in a direction parallel to said direction of motion of said machine, the rotational spacing of said rotational shafts and said support points being equal and the distance from each rotational shaft to the support points on the respective support arms also being equal, such that a parallelogram is formed with one of the sides being fixedly constrained, whereby said organic matter holding means are held in approximate vertical alignment with the surface of the earth at all times during the rotational path of travel thereof.

2. A machine for the planting of organic matter comprising means for movement over the surface of the earth; a frame including means for attachment to a source of motive power; means for holding organic matter, forming openings in the earth, and depositing said organic matter in the earth; rotational means for movement of said holding, forming and depositing means from plant receiving to plant depositing positions; means to drive said rotational means; means for opening said holding forming and depositing means at said plant depositing position to allow the deposition of said organic matter in the earth; said rotational means comprising support wheels for supporting said organic matter holding means and which rotate in parallel planes, said planes being parallel to the direction of motion of said machine and spaced apart; said support wheels being mounted on rotational shafts, which shafts are spaced horizontally apart in a direction parallel to the direction of motion of said machine; said support wheels each including at least one support arm, said support arms from each wheel pivotally supporting said organic matter holding means at two horizontally spaced support points, the horizontal spacing of said rotational shafts and said support points being equal and the distance from each rotational shaft to the support points on the respective support arms also being equal, such that a parallelogram is formed with one of the sides being fixedly constrained, whereby said organic matter holding means are held in approximate vertical alignment with the surface of the earth at all times during the rotational path of travel thereof; said means for holding organic matter, forming openings in the earth, and depositing said organic matter in the earth comprising at least one bucket movably mounted on said rotational means.

3. A machine for the planting of organic matter comprising means for movement over the surface of the earth; a frame including means for attachment to a source of motive power; means for holding organic matter, forming openings in the earth, and depositing said organic matter in the earth; rotational means for movement of said holding, forming and depositing means from plant receiving to plant depositing positions; means to drive said rotational means; means for opening said holding, forming and depositing means at said plant depositing position to allow the deposition of said organic matter in the earth; said means for movement over the surface of the earth comprising at least two machine supporting wheels mounted on support shafts, said shafts mounted on said frame, one of said wheels including said drive means for said rotational means; said means for holding organic matter, forming openings in the earth, and depositing said organic matter in the earth comprising at least one bucket movably mounted on said rotational means; said rotational means comprising two buckets support wheels which rotate in parallel planes, said planes being parallel to the direction of motion of said machine and spaced apart; said bucket support wheels being mounted on rotational shafts, which shafts are spaced horizontally apart in a direction parallel to the direction of motion of said machine; said wheels each including at least one bucket support arm; said bucket support arms from each wheel pivotally supporting said bucket at two horizontally spaced points; the horizontal spacing of said rotational shafts and said bucket support points being equal and the distance from each rotational shaft to the bucket support points on the respective bucket support arms also being equal, such that a parallelogram is formed with one of the sides being fixedly constrained, thereby holding said bucket in approximate vertical alignment with the surface of the earth at all times during its rotational path of travel.

4. A machine as described in claim 3 wherein one of said bucket support wheels is driven by a drive means comprising a first sprocket mounted on one of said support shafts, a second sprocket mounted on one of said rotational shafts, and a link chain interconnecting said first and second sprockets such that said bucket support wheels are positively driven by said drive means at a constant speed directly proportional to the speed of one of said machine supporting wheels.

5. A machine as described in claim 4 wherein at least one of each of said support and rotational shafts are extended to allow greater horizontal spacing of said machine supporting wheels while maintaining said sprockets in proper alignment for driving said bucket support wheels.

6. A machine as described in claim 4 wherein said rotational path of said bucket, as defined by said bucket support wheels and arms, carries said bucket to a position adjacent the surface of the earth such that said bucket partially penetrates said earth surface thereby forming an opening in the earth.

7. A machine as described in claim 6 wherein said bucket comprises an enclosure, generally in the shape of an upright V, having at least two walls, one of which is movable away from the remaining wall.

8. A machine as described in claim 7 wherein said movable bucket wall pivots away from said remaining wall in a direction parallel to the direction of motion of said machine as the lower portion of said bucket penetrates the surface of the earth, by means of a pivot arm extending from said movable bucket wall, which arm is operably engaged with said means for opening said holding, forming and depositing means such that an opening is formed in the earth allowing the organic matter held in said bucket to slide out of said bucket and be deposited in said opening in the earth.

9. A machine as described in claim 8 wherein a change in the spacing of the openings in the earth is accomplished by increasing or decreasing the number of bucket support arms and buckets mounted on said bucket support wheels.

10. A machine as described in claim 9 wherein said bucket includes blades which penetrate the earth, said blades formed from steel having a high carbon content, which steel is formed into said blades and then annealed to a hardened state.

11. A machine as described in claim 9 wherein said means for opening said holding, forming and depositing means are camming means including a cam follower mounted on said pivot arm and camming surface, said camming surface arranged to pivot said movable bucket wall by means of engagement with said cam follower only after said lower bucket portion has penetrated the earth.

12. A machine as described in claim 11 wherein said cam follower is a roller adjustably mounted on said pivot arm and said camming surface is a generally curvilinear track fixedly attached to said frame providing a surface for the engagement of said roller.

13. A machine as described in claim 12 wherein said adjustable mounting for said roller includes a slot and threaded securing means such that said securing means may be utilized to position said roller at various positions along said slot thereby changing the predetermined position at which said roller engages said track, thereby changing the amount of travel of said movable wall and the corresponding size of the opening in the surface of the earth formed by said bucket including said movable wall.

14. A machine as described in claim 11 wherein said machine also includes packing means comprising a pair of packing wheels rotationally mounted on support members to roll over the surface of the earth behind the area wherein said buckets are forming said openings in the earth, the planes of said wheels being at an angle with the vertical and with one another such that the lowermost portions of said packing wheels are spaced apart just enough to allow the passage therebetween of said organic matter deposited in the earth, thereby firmly packing the earth in close proximity to said organic matter securely around the organic matter, and the uppermost portions of said packing wheels spaced further apart such that any portion of said deposited organic matter extending above the earth will pass therebetween.

15. A machine as described in claim 14 wherein said packing wheels and support members are pivotally mounted as a unit on said frame in order to accommodate any irregularities in the surface of the earth over which said machine passes.

16. A machine as described in claim 15 wherein said packing wheels include a rubber lip mounted on the circumference of each of said wheels such that said lips extend past the edges of said wheels thereby forming flexible but resilient packing surfaces which securely pack earth about said deposited organic matter without forming troughs alongside said deposited matter.

17. A machine as described in claim 11 wherein said machine includes packing means comprising a support arm pivotally mounted on said frame, said support arm including a packing roller rotationally mounted thereon such that said packing roller rolls over, and securely packs, the surface of the earth, directly behind the area wherein said buckets are forming said openings in the earth, to a point immediately adjacent said deposited organic matter, at which point a packer camming means, operably associated with said bucket support wheels and arms, raises said support arm, including said packing roller, over any portion of said deposited organic matter extending above the earth, after which raising said packer camming means releases said support arm and roller allowing said arm and roller to gravitate to the surface of the earth in order to roll, and thereby securely pack, the earth adjacent the next deposited organic matter.

18. A machine as described in claim 17 wherein said packer camming means comprises a camming surface formed about one of said pivotal support points of said bucket, and a curvilinear cam following track pivotally mounted on said support arm such that as the rotation of said bucket support wheels withdraws said bucket from the earth, said camming surface engages said cam following track thereby lifting said support arm and roller over said deposited organic matter to a point beyond said organic matter at which point said support arm and roller are released to gravitate back to the surface of the earth.

19. A machine for the planting of organic matter comprising means for movement over the surface of the earth; a frame including means for attachment to a source of motive power; at least one bucket for holding organic matter, forming openings in the earth, and depositing said organic matter in the earth; rotational means for movement of said bucket in a circular path whose plane is parallel to the direction of motion of said machine while said bucket is held vertically upright at all times; said rotational means including bucket support wheels mounted on support shafts; said support wheels offset horizontally a first distance in a direction laterally of said machine; said support shafts offset a second distance parallel to the direction of motion of said machine; said buckets each supported at two points each substantially equidistant from one of said support shafts; said points spaced apart a distance substantially equivalent to said second distance in a direction parallel to the direction of motion of said machine such that a rotational parallelogram is formed supporting said buckets substantially vertically at all times; means to drive said rotational means; means for opening said bucket in a direction parallel to the direction of motion of said machine at a predetermined position to allow the deposition of said organic matter in the earth; and packing means to secure said deposited matter in the earth said packing means comprising a pair of packing wheels rotationally mounted on support members to roll over the surface of the earth behind the area wherein said buckets are forming said openings in the earth, the planes of said wheels being at an angle with the vertical and with one another such that the lowermost portions of said packing wheels are spaced apart just enough to allow the passage therebetween of said organic matter deposited in the earth, thereby firmly packing the earth in close proximity to said organic matter securely around the organic matter, and the uppermost portions of said packing wheels spaced further apart such that any portion of said deposited organic matter extending above the earth will pass therebetween.

20. A machine as described in claim 19 wherein said packing wheels and support members are pivotally mounted as a unit on said frame in order to accommodate any irregularities in the surface of the earth over which said machine passes; said unit including means for supporting additional weight such that the pressure exerted by said packing wheels varies in proportion to said additional weight.

21. A machine for the planting of organic matter comprising means for movement over the surface of the earth; a frame including means for attachment to a source of motive power; at least one bucket for holding organic matter, forming openings in the earth, and depositing said organic matter in the earth; rotational means for movement of said bucket in a circular path whose plane is parallel to the direction of motion of said machine while said bucket is held vertically upright at all times; means to drive said rotational means; means for opening said bucket at a predetermined position to allow the deposition of said organic matter in the earth; and packing means to secure said deposited matter in the earth; said packing means comprising a support arm pivotally mounted on said frame downwardly and rearwardly thereof; said support arm including a packing roller rotationally mounted thereon such that said packing roller rolls over, and securely packs, the surface of the earth, directly behind the area wherein said buckets are forming said openings in the earth, to a point immediately adjacent said deposited organic matter, at which point a packer camming means, including lifting means operably associated with said bucket support wheels and arms, lift said packing means to provide contact with said deposited organic matter; said lifting means engaging following means on said packing means for raising said support arm including said packing roller rearwardly and upwardly over any portion of said deposited organic matter extending above the earth as said machine is moved forwardly, after which said packer camming means releases said support arm and roller allowing said arm and roller to gravitate back to the surface of the earth in order to roll, and thereby securely pack, the earth adjacent the next deposited organic matter.

22. A machine as described in claim 21 wherein said lifting means comprises a camming surface formed about one of said pivotal support points of said bucket, said following means including a curvilinear cam following track pivotally mounted on said support arm such that as the rotation of said bucket support wheels withdraws said bucket from the earth, said camming surface engages said cam following track thereby lifting said support arm and roller over said deposited organic matter to a point beyond said organic matter where said camming surface disengages from said cam track, said support arm and roller being released to gravitate back to the surface of the earth.

23. A machine for the planting of organic matter comprising means for movement over the surface of the earth; a frame; at least one element for holding organic matter, forming openings in the earth, and depositing said organic matter in the earth; rotational means for movement of said element in a circular path whose plane is parallel to the direction of motion of said machine while said element is held vertically upright at all times; said rotational means including element support shafts offset horizontally both a first distance in a direction laterally of said machine and a second distance parallel to the direction of motion of said machine; said elements each supported at two points each substantially equidistant from one of said support shafts; said points spaced apart a distance substantially equivalent to said second distance in a direction parallel to the direction of motion of said machine such that a rotational parallelogram is formed supporting said elements substantially vertically at all times; means to drive said rotational means at a constant speed such that the spacing of said openings in the earth is accomplished by changing the number of said elements included in said machine; camming means for opening said elements in a direction parallel to the direction of motion of said machine at a predetermined position to allow the deposition of said organic matter in the earth; and packing means to secure said deposited matter in the earth.

24. A machine for the planting of organic matter comprising means for movement over the surface of the earth; a frame; at least one element for holding organic matter, forming openings in the earth, and depositing said organic matter in the earth; rotational means for movement of said element in a circular path whose plane is parallel to the direction of motion of said machine while said element is held vertically upright at all times; means to drive said rotational means at a constant speed such that the spacing of said openings the earth is accomplished by changing the number of said elements included in said machine; camming means for opening said elements in a direction parallel to the direction of motion of said machine at a predetermined position to allow the deposition of said organic matter in the earth; and packing means to secure said deposited matter in the earth; said elements comprising buckets pivotally mounted on said rotational means, said buckets comprising enclosures, generally in the shape of an upright V, having at least two walls, one of which is movable away from the remaining wall; said rotational means comprising two bucket support wheels which rotate in vertical planes, said planes being parallel to the direction of motion of said machine and spaced horizontally apart, said bucket support wheels being mounted on rotational shafts, which shafts are spaced horizontally apart in the same horizontal plane in a direction parallel to the direction of motion of said machine, one of said bucket support wheels being driven by said drive means, said wheels each including at least one bucket support arm, said bucket support arms from each wheel pivotally supporting said bucket at two horizontally spaced points, the horizontal spacing of said rotational shafts and said bucket support points being equal and the distance from each rotational shaft to the bucket support points on the respective bucket support arms also being equal, such that a prallelogram is formed with one of the sides fixedly constrained, thereby holding said bucket in approximate vertical alignment with the surface of the earth at all times during its rotational path of travel.

25. A machine as described in claim 24 wherein said movable bucket wall pivots away from said remaining walls in a direction parallel to the direction of motion of said machine as the lower portion of said bucket penetrates the surface of the earth, by means of a pivot arm extending from said bucket, which arm is operably engaged with said camming means, such that an opening is formed in the earth allowing the organic matter held in said bucket to slide out of said bucket and be deposited in said opening in the earth.

26. A machine as described in claim 25 wherein said pivot arm includes a cam follower which comprises a portion of said camming means, said camming means also including a camming surface, said camming surface arranged to pivot said movable wall by means of engagement with said cam follower and pivot arm only after said lower bucket portion has penetrated the earth.

* * * * *